(12) United States Patent
Kitada

(10) Patent No.: US 8,331,220 B2
(45) Date of Patent: Dec. 11, 2012

(54) EDGE NODE REDUNDANT SYSTEM

(75) Inventor: Atsushi Kitada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 211 days.

(21) Appl. No.: 12/541,293

(22) Filed: Aug. 14, 2009

(65) Prior Publication Data

US 2009/0296568 A1    Dec. 3, 2009

Related U.S. Application Data

(63) Continuation of application No. PCT/JP2007/000317, filed on Mar. 28, 2007.

(51) Int. Cl.
*G01R 31/08* (2006.01)
(52) U.S. Cl. .................................. 370/217
(58) Field of Classification Search .......... 370/216–224, 370/242–244, 246–251, 395.3, 395.52, 401; 709/239; 379/9.05, 221.01, 221.03, 221.04
See application file for complete search history.

(56) References Cited

U.S. PATENT DOCUMENTS

| | | | |
|---|---|---|---|
| 5,661,719 A * | 8/1997 | Townsend et al. | 370/216 |
| 2004/0010510 A1 * | 1/2004 | Hotti | 707/103 R |
| 2005/0265230 A1 * | 12/2005 | Na et al. | 370/219 |
| 2006/0198368 A1 * | 9/2006 | Guichard et al. | 370/389 |
| 2006/0256801 A1 | 11/2006 | Endo | |
| 2007/0171817 A1 * | 7/2007 | Fujita et al. | 370/225 |
| 2008/0002723 A1 * | 1/2008 | Pusateri | 370/401 |
| 2008/0170493 A1 * | 7/2008 | Vasseur | 370/217 |

FOREIGN PATENT DOCUMENTS

| | | |
|---|---|---|
| JP | 2002-232463 | 8/2002 |
| JP | 2002-247113 | 8/2002 |
| JP | 2005-136690 | 5/2005 |
| JP | 2006-054766 | 2/2006 |
| JP | 2006-279375 | 10/2006 |
| JP | 2006-310928 | 11/2006 |

OTHER PUBLICATIONS

International Search Report dated Jun. 26, 2007, from the corresponding International Application.

* cited by examiner

*Primary Examiner* — Kwang B Yao
*Assistant Examiner* — Tung Q Tran
(74) *Attorney, Agent, or Firm* — Katten Muchin Rosenman LLP

(57) ABSTRACT

A client terminal at one location a is accommodated in an edge node (gateway) having a redundant configuration composed of a primary node and a secondary node. Normally a primary edge node PE A is used to enable communications with partner client terminals at locations b and c via opposing edge nodes PE B and PE C. Normally, a database storing the information of a label used by the primary edge node is synchronized with the database of the secondary edge node. A primary loopback address is stored in the secondary edge node and nullified. When the primary edge node fails, the loopback address of the primary edge node is validated and the secondary edge node restarts communications with the opposing edge nodes using the information of the database storing the information of the label used by the primary PE and the same label as the primary edge node.

10 Claims, 20 Drawing Sheets

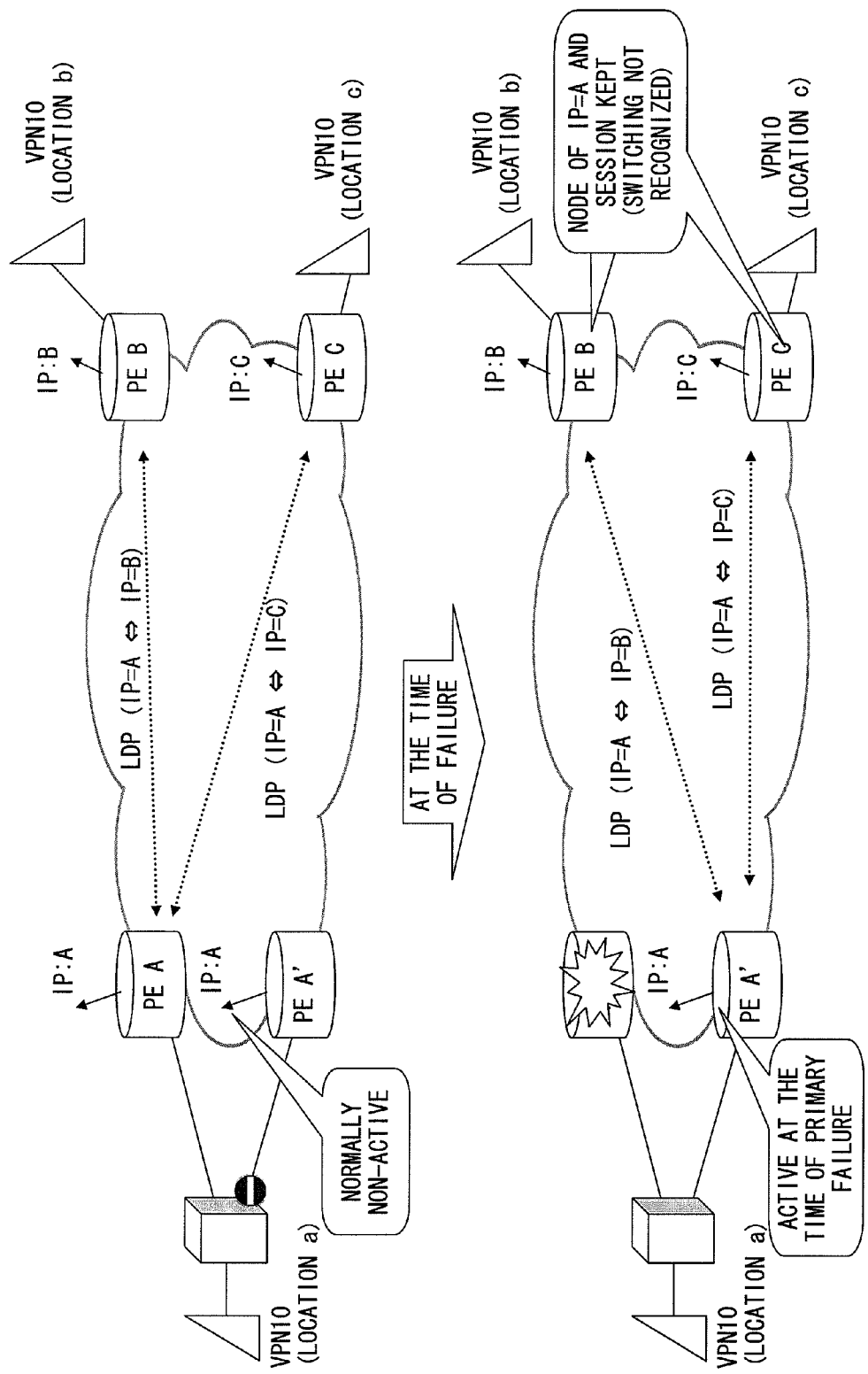
F I G. 5

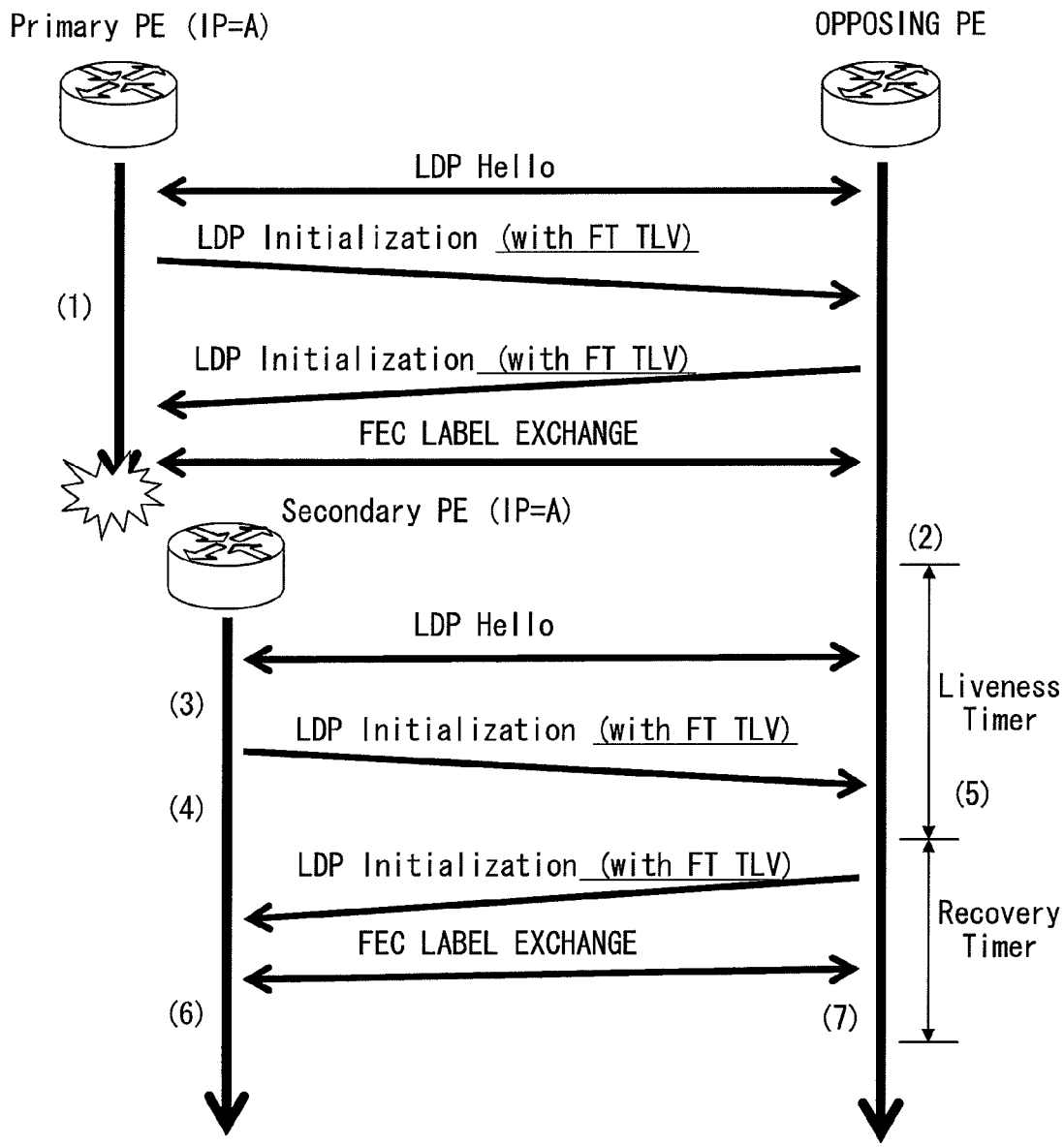
F I G. 9

EDGE NODE REDUNDANT SYSTEM

CROSS-REFERENCE TO RELATED APPLICATION

This application is a continuation application of International PCT Application No. PCT/JP2007/000317, filed on Mar. 28, 2007, the entire contents of which are incorporated herein by reference.

FIELD

The present invention relates to an edge node redundant system in a packet transport network, such as a VPN (virtual private network) or the like.

BACKGROUND

In a packet transport network, information is exchanged between nodes by a routing/signaling protocol and the route of a packet to be transported is controlled. For example, in a network using MPLS (multi-protocol label switching) as its core, its reachability to each node is checked by a routing protocol, such as OSPF (open shortest path fast) or the like, sometimes traffic engineering information (for example, a free band, etc.) is exchanged and packet transport tunnel labels are distributed by a signaling protocol, such as an LDP (label distribution protocol), a RSVP-TE (resource reservation protocol traffic extension) or the like. Then, in a service for emulating an Ethernet line (called VPWS and VPLS in the cases of point-to-point and multi-point services, respectively; see RFC4447 and RFC4762 for VPWS and VPLS, respectively), labels for identifying an emulated line are distributed using a LDP (label distribution protocol) between MPLS edge nodes (PE (provider edge, so-called gateway), are attached to (capsuled into) the Ethernet frame of a client together with tunnel labels for transporting the MPLS network and are transported. The emulated (virtual) line built thus is called PW (pseudo wire).

FIG. 1 explains a redundant edge node.

A redundant node can be realized at high speed and efficiently by a public technology, such as fast re-route or the like, within a VPLS core network. However, in order to provide higher availability, as in RFC4762, a client location is accommodated in a plurality of redundant PEs and a connection method for specifying one PE and the others as primary and secondary, respectively, is required. In communications between client locations CE, a transmitting destination and a transmitting source are specified by an MAC address. However, communications between edge nodes are routed by a label for specifying a PW and a tunnel.

However, in the case of the prior art, since it is necessary to keep a secondary PW, twice PWs are required for point-to-point communications and four times of PWs as that at the time of a non-redundancy are required for the entire network in order to promote a redundant edge node in a full-mesh connection (of it, ¾ is not normally used). Furthermore, the load of the update process of a route information table at the time of a primary system failure (MAC table flush for clearing the MAC learning table of a point-to-point PE in the case of VPLS) is a problem.

FIG. 2 explains the problems of the prior art. The upper section of FIG. 2 illustrates a state before a failure occurs. When a client location a, such as a computer or the like, communicates with other client locations b and c, such as computers or the like, it is assumed that the edge node PE A of a network is made redundant and a secondary edge node PE A' is provided. Communications are normally conducted via a primary edge node PE A. At this time, tables in which output ports p1, pw-AB and pw-AC are related to MAC addresses a, b and c, respectively, are stored in the edge node PEA. The MAC address a is the MAC address of the location a. The MAC addresses b and c are the MAC addresses of the locations b and c, respectively. In this case, a PW is formed in order to transport a packet from the edge node PE A to edge nodes PE B and PE C. This is a primary PW. However, although the edge node PE A' is not normally used, it is necessary to set another PW from the edge node PE A' to the edge nodes PE B and PE C as a secondary PW.

Then, when a failure occurs in a primary PE, as illustrated in the lower section of FIG. 2, the edge node PE A transmits the erase message of MAC address (in the case of FIG. 2, the MAC address a since a port accommodating the location a fails) of a failed location to the opposing node edges PE B and PE C. Then, the MAC address a is erased from the MAC tables of the edge nodes PE B and PE C. Simultaneously, when receiving an Ethernet frame from the location a (accompanying a failure between the location a and the PE A), the edge node PE A' learns the transmitting source MAC address a and also start communications using a PW provided in advance. Since the PE B and PE C receive the Ethernet frame from another PW, they learn the MAC again.

As clear from this, when making an edge node redundant, since it is necessary to set a PW to a secondary edge node, many network sources are consumed.

Patent document 1 discloses a technology for attaching respective peculiar MAC addresses and IP addresses and also a common virtual MAC address and a virtual IP address to operating and waiting servers in an information configuration composed of operating and waiting systems.

Patent document 1: Japanese Laid-open Patent Publication No. 2005-136690

SUMMARY

The edge node redundant system of the present invention is the redundant system of an edge node in a network having redundant edge nodes composed of primary and secondary edge nodes. The secondary edge node includes a primary peculiar address setting unit for storing the unique address of the primary edge node, normally nullifying the unique address of the primary edge node and validating the unique address of the primary edge node as the unique address of the secondary edge node when the primary edge node fails, a primary line data duplicate storage unit for storing the same line data as line data used to establish communications at the normal time of a primary edge node and a communication establishment unit for establishing communications instead of the primary edge node, using the unique address validated by the primary unique address setting unit and the line data stored in the primary line data duplicate storage unit at the failure time of the primary edge node.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed

BRIEF DESCRIPTION OF DRAWINGS

FIG. 5 explains the operation of the preferred embodiment of the present invention.

FIG. 9 illustrates the summary of LDP graceful restart (No. 1).

DESCRIPTION OF EMBODIMENTS

Figure 1:
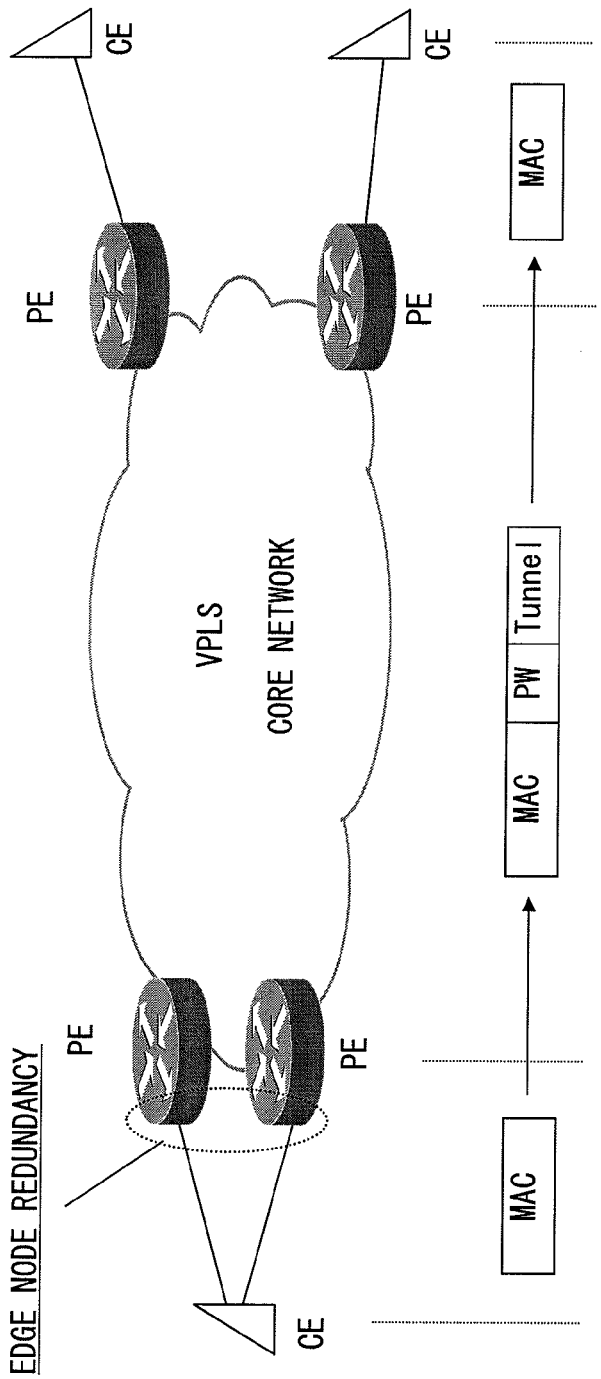
FIG. 1 explains a redundant edge node.
Figure 2:
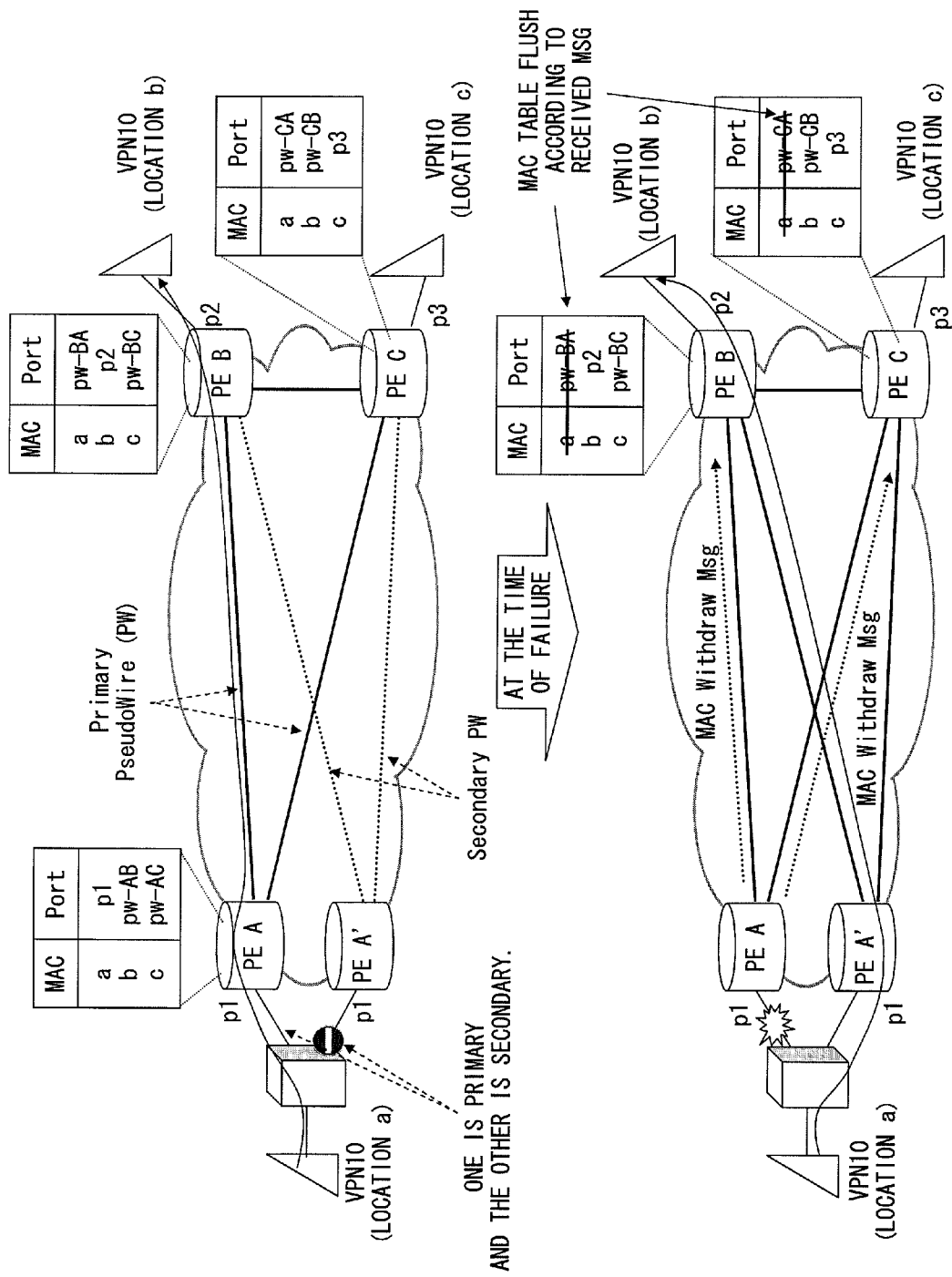
FIG. 2 explains the problems of the prior art.
Figure 3:
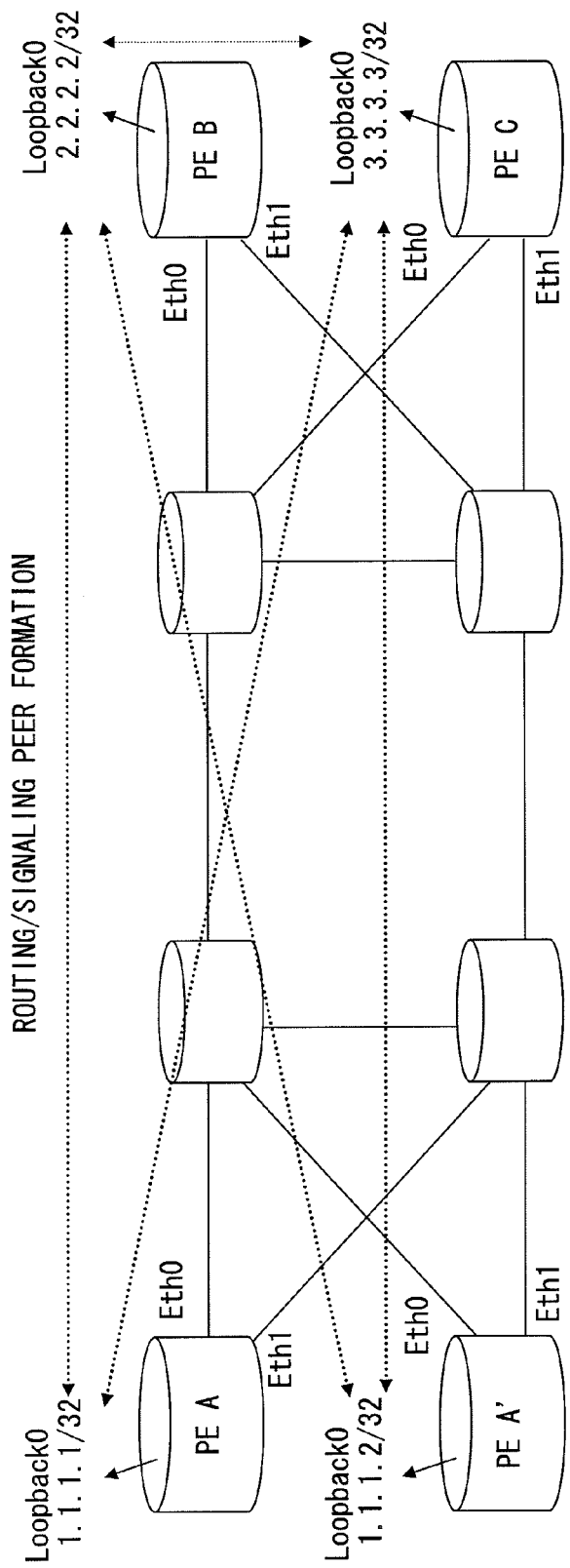
FIG. 3 explains a routing/signaling identifier.

FIG. 3 explains a routing/signaling identifier.

A packet transport node (generally a router) is called loopback interface besides physical interface (Ethernet, ATM, etc.). It can have logical interfaces having no adjacent relation with other nodes and an IP address is attached to each interface. Although in PC and the like, only an internal communication IP address, such as 127.0.0.1 or the like is the loopback interface, in the packet transport node, a unique IP address is attached to the loopback interface within a network and route information is exchanged using the loopback address as a routing/signaling identifier. (The physical interface can be also used as the identifier. However, since the identifier changes although actually communications are available via another interface a routing/signaling protocol, when the interface downs, the routing/signaling protocol downs. Therefore, generally the loopback address which does not down as long as the node itself does not fail is used.) For the routing/signaling protocol, LDP, RSVP-TE, iBGP, MP-BGP or the like is used. In VPLS, a PW is built by LDP (targeted LDP).

Conversely, for example, if in VPLS, the data frame of a client is capsuled by a PW label whose LDP session identifier (IP address) by which the PW is set up the same and which is distributed by itself in the same session is received, it is recognized as the same session by an opposing PE (even if the peer has been actually switched over).

Figure 4:
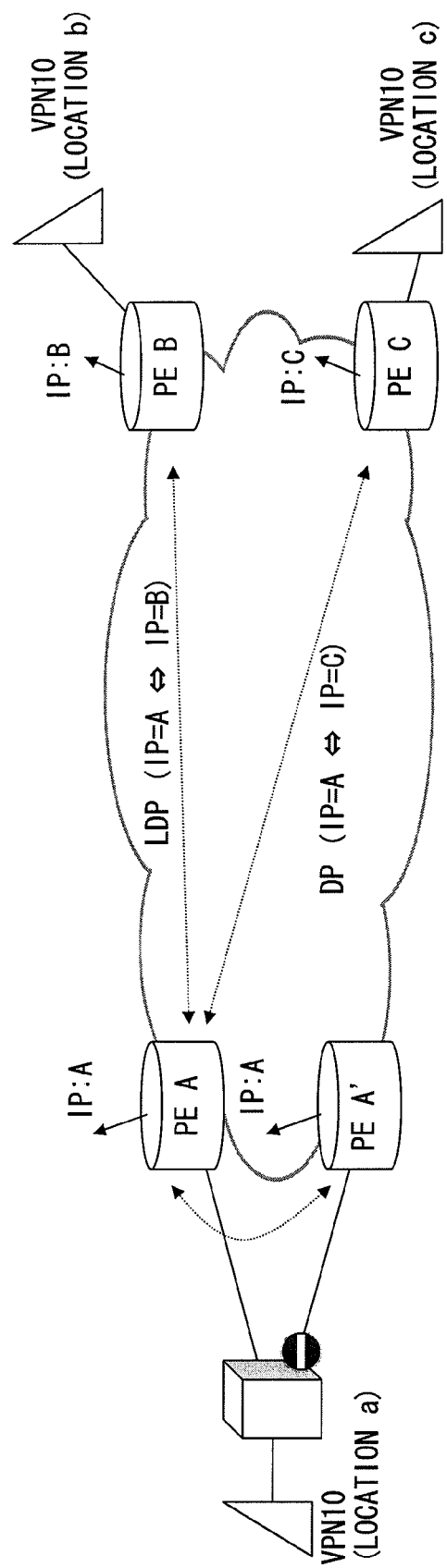
FIG. 4 explains the summary of the preferred embodiment of the present invention.

FIG. 4 explains the summary of the preferred embodiment of the present invention.

In the preferred embodiment of the present invention, a PE accommodating client locations as a primary PE (a primary PE, PE A) establishes an LDP session with an opposing PE between the PEs constituting a redundant edge node and exchanges PW labels. Then, it notifies a secondary PE (a secondary PE, PE A') of the information/shares (mirrors) the information with the secondary PE (mirrors the information to the secondary PE). Between the primary/secondary PEs, their PW label databases are synchronized from time to time and also life or death monitoring for checking whether the primary PE is active is performed. If the primary PE has failed (for example, the result of the life or death monitoring is down), the secondary PE keeps the session instead of the primary PE and also a client data frame is capsuled by the synchronized database and is transmitted/received. Thus, a virtual LDP control plane is realized and the switching between the primary/secondary PEs can be made invisible for the opposing PE.

Specifically, primary/secondary PEs are determined between PEs and a primary PE sets up a PW between PE B and PE C using a loopback IP (IP:A). Then, PE A notifies PE A' of PW setting information (mirrors PW setting information to PE A'). When PE A fails, PE A' is graded up to primary and keeps the LDP session between PE B and PE C by the loopback IP (IP:A). A user frame is capsuled by the mirrored PW information and transmitted/received.

FIG. 5 explains the operation of the preferred embodiment of the present invention.

In the preferred embodiment with the above-described configuration, a secondary PE shares a loopback address being a session identifier too in order to keep the LDP session set up between a primary PE and an opposing PE. Normally, a secondary PE keeps the loopback address non-active. When the failure of the primary PE is detected, the secondary PE makes the loopback address active, sets it in the transmitting source IP address of an LDP packet and the identifier in LDP message and transmits it. When the LDP packet is received, it is recognized as the same LDP session by the opposing PE.

Specifically, although normally, as illustrated in the upper section of FIG. 5, PE A communicates with PE B and PE C using IP:A, At the time of failure, as illustrated in the lower section of FIG. 5, PE A' communicates with PE B and PE C using IP:A.

Figure 6:
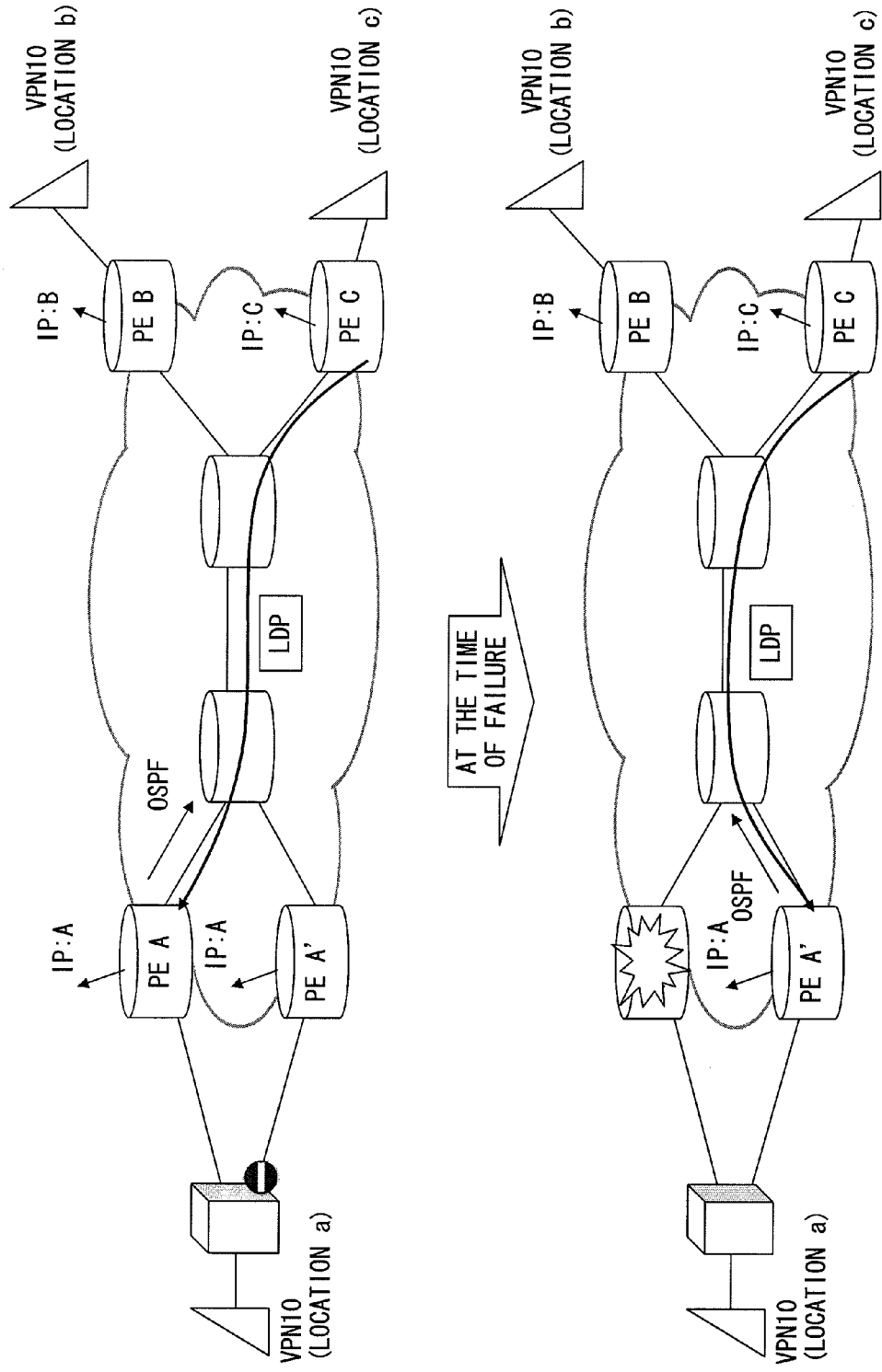
FIG. 6 explains the operation in the case where a primary PE is switched over to a secondary PE.

FIG. 6 explains the operation in the case where a primary PE is switched over to a secondary PE.

Since the above-described loopback address has no adjacent relation with any node, it is necessary to publicize routing addressed to the address by a routing protocol, such as OSPF or the like. In this preferred embodiment of the present invention, although normally a primary PE publicizes routing addressed to the address, at the time of failure, a secondary PE publicizes routing addressed to the address instead of the primary PE.

Figure 7:
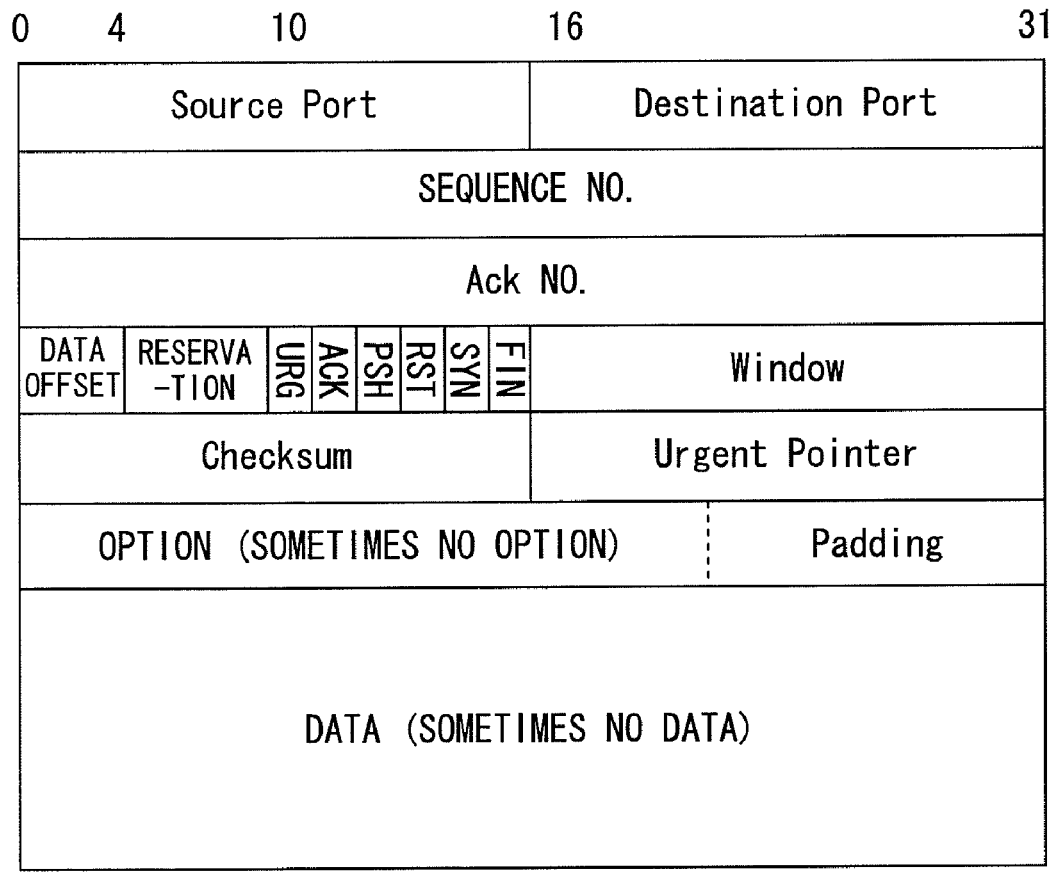
FIG. 7 is the data format of TCP.

FIG. 7 is the data format of TCP.

Since the LDP protocol operates on TCP (only hello message operates on UDP, in order to keep the LDP session without the opposing PE detecting its down, session parameters, such as the sequence number and Ack number of TCP, window size and the like are synchronized between primary/ secondary PEs from time to time. As to hello, since it is UDP (there is no concept of a session), it is OK if IP addresses are the same.

Each field of TCP data format will be explained below.
Source port: Transmitting source port number
Destination port: Receiving source port number
Sequence number: Transmitted data order expressed by bytes
Ack number: Indicate the sequence number of data to be received subsequently
Data offset: Indicate the head position of data. One unit is 4-byte length and in the case of 20-byte header, "5" enters here.
Control bit: Six control bits
URG: Mean data to be urgently processed
The position of urgent data is indicated by an urgent pointer.
ACK: All "1" other than data yn indicating whether the Ack number is valid
PSH: Indicate whether to directly transfer receive ddata to application.
RST: Used to initialize a connection.
SYN: Used to establish a connection.
FIN: Mean the last segment of a TCP session.
Window: Report receivable data size.
Checksum: Data checksum of IP pseudo header and the header/data of TCP. The complementary number of 1.
Urgent pointer: A pointer indicating an urgent data storage place when URG=1. A byte length from the data head for the numeric values of this pointer is urgent data.
Option: Used to improve TCP performance. However, limited to 40 pieces of data at maximum.
Padding: Bits used to adjust by filling 0 in such a way that the length of a TCP packet becomes the multiple of 32 bits.
Data: User data FIG. 8 explains a process for synchronizing session parameters and switching a primary PE to a secondary PE in such a way that an opposing PE does not sense session down.

Firstly, in the TCP (LDP) session establishment process, TCP SYN message is transmitted from PE A to PE B using a TCP port a. In this example, the window size is set to 5000 for receivable data size notification. For example, the sequence number of the TCP SYN message transmitted from PE A and the ACK number are set 1001 and 0, respectively. Upon receipt of this, PE B sets the window size to 3000 and transmits TCP SYN/ACK to PE A from a TCP port b. In this example, the sequence number and Ack number are set to 2000 and 1001, respectively. Upon receipt of this, PE A sets the sequence number and Ack number to 1001 and 2001, respectively and returns TCPAck to PE B. Thus, a TCP (LDP) session is established. PE A notifies PE A' of the establishment of the LDP session between the port a of PE A and the port b of PE B (1).

After the establishment of the LDP session, PE A exchanges LDP data, such as label mapping and the like, with PE B. PE A notifies PE A' of the sequence number and Ack number that are used for communications from time to time in the middle of the communication with PE B(2).

When detecting the failure of PE A(3), PE A' sets the TCP port of its own device to a and transmits the LDP data to PE B using the notification number and Ack number notified by PE A. Since the transmitting source IP port of the LDP data received from PE A' is the same and also has a sequence number to be expected to receive, PE B starts communicating with PE A' without detecting session down (4).

Alternatively, since the PW label database is kept as it is although the LDP session itself is seen to be once interrupted, by switching between the primary and secondary PEs combining publicly known technologies, such as graceful restart and the like, a switching means for keeping the amount of information to be synchronized at a minimum level compared with the case where session parameters are synchronized can be realized.

Figure 10:
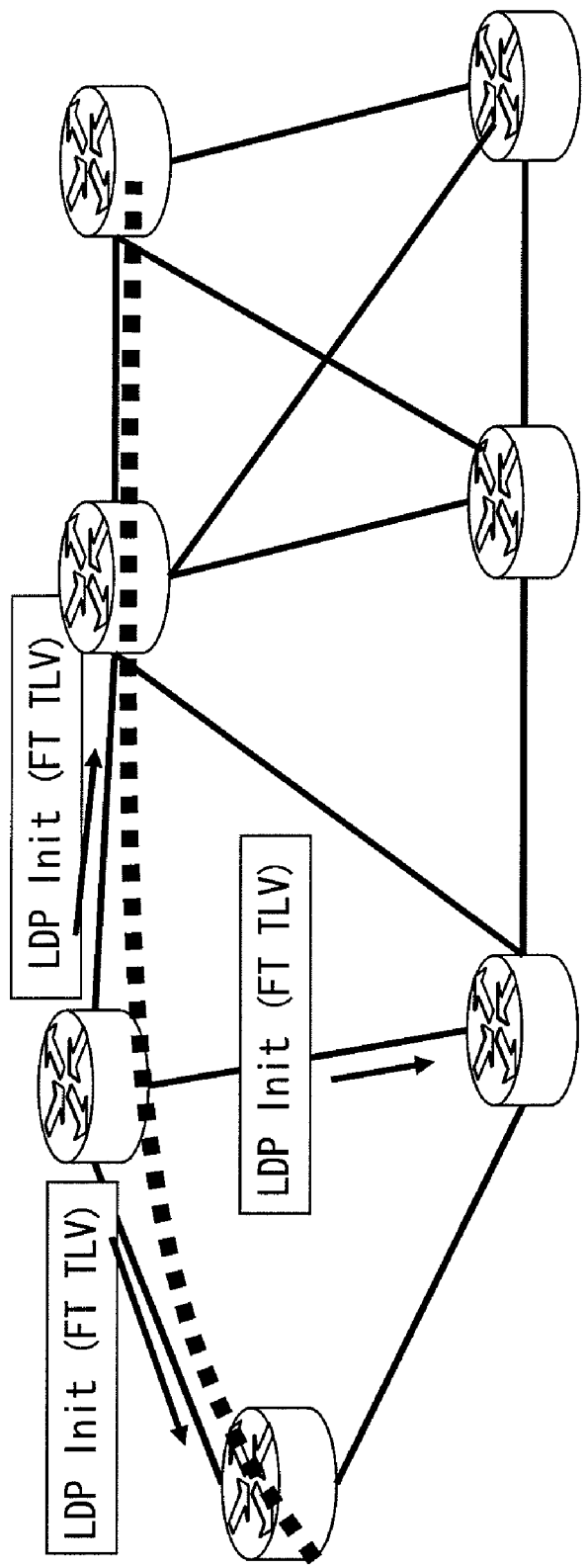
FIG. 10 illustrates the summary of LDP graceful restart (No. 2).
Figure 11:
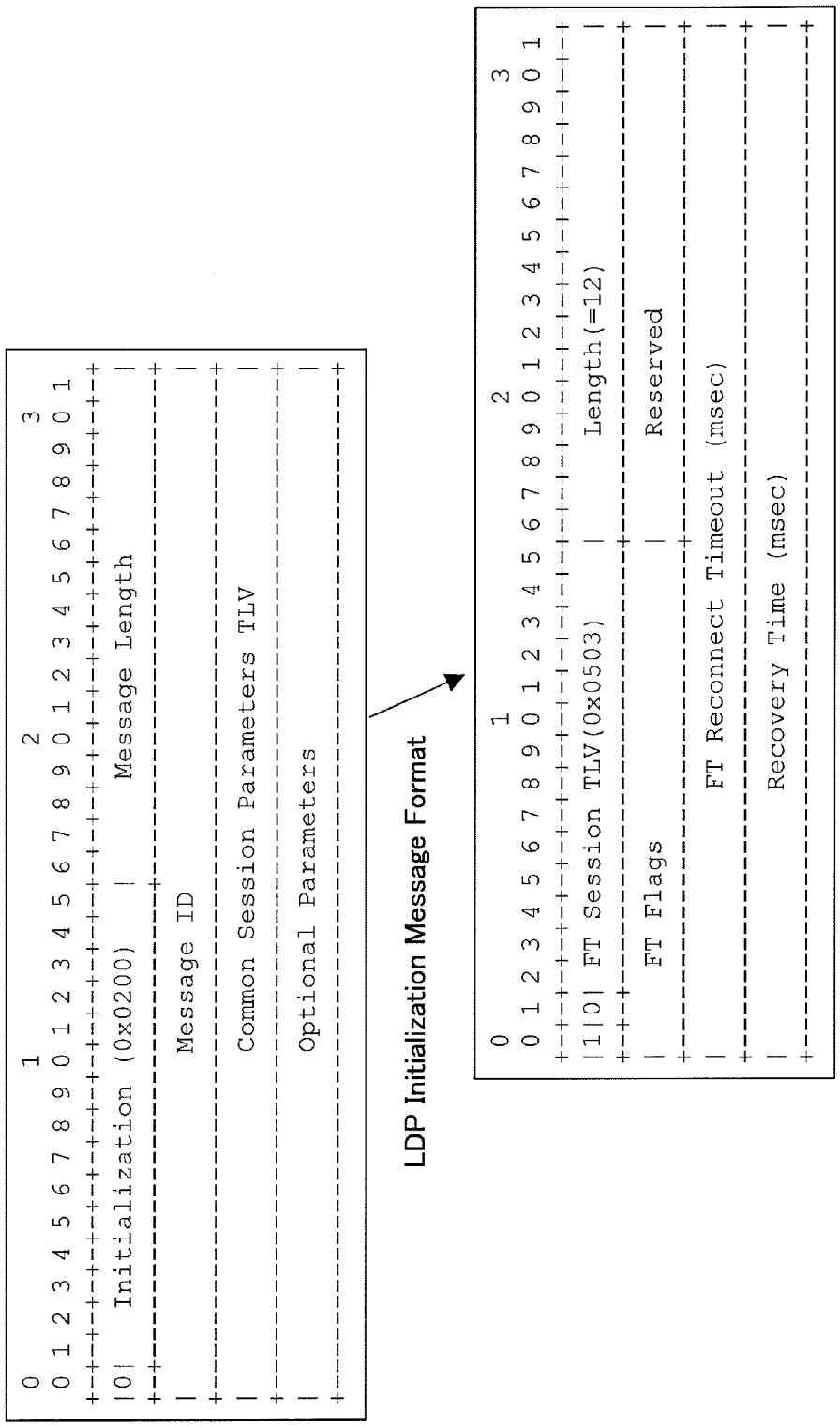
FIG. 11 illustrates the summary of LDP graceful restart (No. 3).

FIGS. 9 through 11 illustrates the summary of LDP graceful restart. The LDP graceful restart is specified in RFC3478 in detail. The graceful restart will be briefly explained below. The availability of graceful restart support is indicated by reporting fault tolerant TLV (FV TLV) in LDP initialization message at the time of initialization between a primary PE and an opposing PE.

FIG. 9 illustrates the initialization of the graceful restart and switching from a primary PE to a secondary PE.

In FIG. 9, firstly, when LDP is initialized between a primary PE and an opposing PE, LDP hello message is exchanged and the start of initialization is reported between them. Then, when the LDP initialization message is exchanged, the support of graceful restart is indicated between them by exchanging the LDP initialization message in which FT TLV is set and after the exchange of the LDP initialization message, FEC labels are exchanged (1). FEC is the abbreviation of forwarding equivalent class and, for example, in VPLS, indicates a PW label.

When a primary PE fails and LDP session down is detected by an opposing PE, the entry of restart LSR is set to "stale" and a liveness timer (a time the restart LSR holds an entry) is initialized (2). In this case, "stale" means to temporarily stop the update of an entry. Since the primary PE cannot operate due to the failure, a secondary PE starts operating. Firstly, a secondary PE starts an MPLS forwarding state holding timer and sets all the entries of restart LSR to "stale". Then, it restarts its own device and exchanges LDP hello message with the opposing PE. If it fails in the restart, it sets FT reconnect timeout to 0 and notifies the opposing PE of this failure (3). Then, LDP initialization message in which FT TLV is set is exchanged between the secondary and opposing PEs. In this case, the secondary PE notifies the opposing PE of the timeout value of the current MPLS forwarding state holding time as "recovery time" (4). Upon receipt of the LDP initialization message from the secondary PE, the opposing PE establishes an LDP session, terminates the liveness timer and starts the counting of a recovery time using the recovery time (5). Then, when exchanging FEC labels, the secondary PE publicizes the label of the FEC. If the stale entry is publicized with the same value, the stale state is cancelled. If the stale entry is publicized with a different value, the label is updated to a new label. If the stale entry is not publicized before the recovery timer times out, the entry is deleted (7). Although in normal graceful restart, the same PE restarts, in the preferred embodiment of the present invention, PE is switched from a primary one to a secondary one. However, since the primary and secondary PEs have the same parameters, the switching of the transmitting side PE from the primary to the secondary cannot be recognized.

FIGS. 10 and 11 explain the summary of LDP graceful restart.

The availability of graceful restart support is indicated by reporting fault tolerant TLV (FV TLV) in the LDP initialization message at the time of LDP initialization between restart LSR and peer LSR.

The following pieces of information is set in FT TLV.

FT reconnect timeout: Waiting time (msec) after LDP communication failure detection, of which the transmitting side of TLV requires the receiving side Recovery time: Time (msec) which LSR holds a forwarding state When detecting a failure, the peer LSR sets a related forwarding state to "stale". Furthermore, it holds the "stale" state and transports a forwarding state. When the LDP communication is restored, the stale" state of the forwarding state is restored and refreshed. If the "stale" state is not restored within a requested time, the parameters of the forwarding state are deleted.

As illustrated in FIG. 11, FT session TLV is reported as optional parameters in the LDP initialization message. The format in the upper left of FIG. 11 is the format of LDP initialization message and the format in the lower right of FIG. 11 is the format of FT session TLV.

Figure 12:
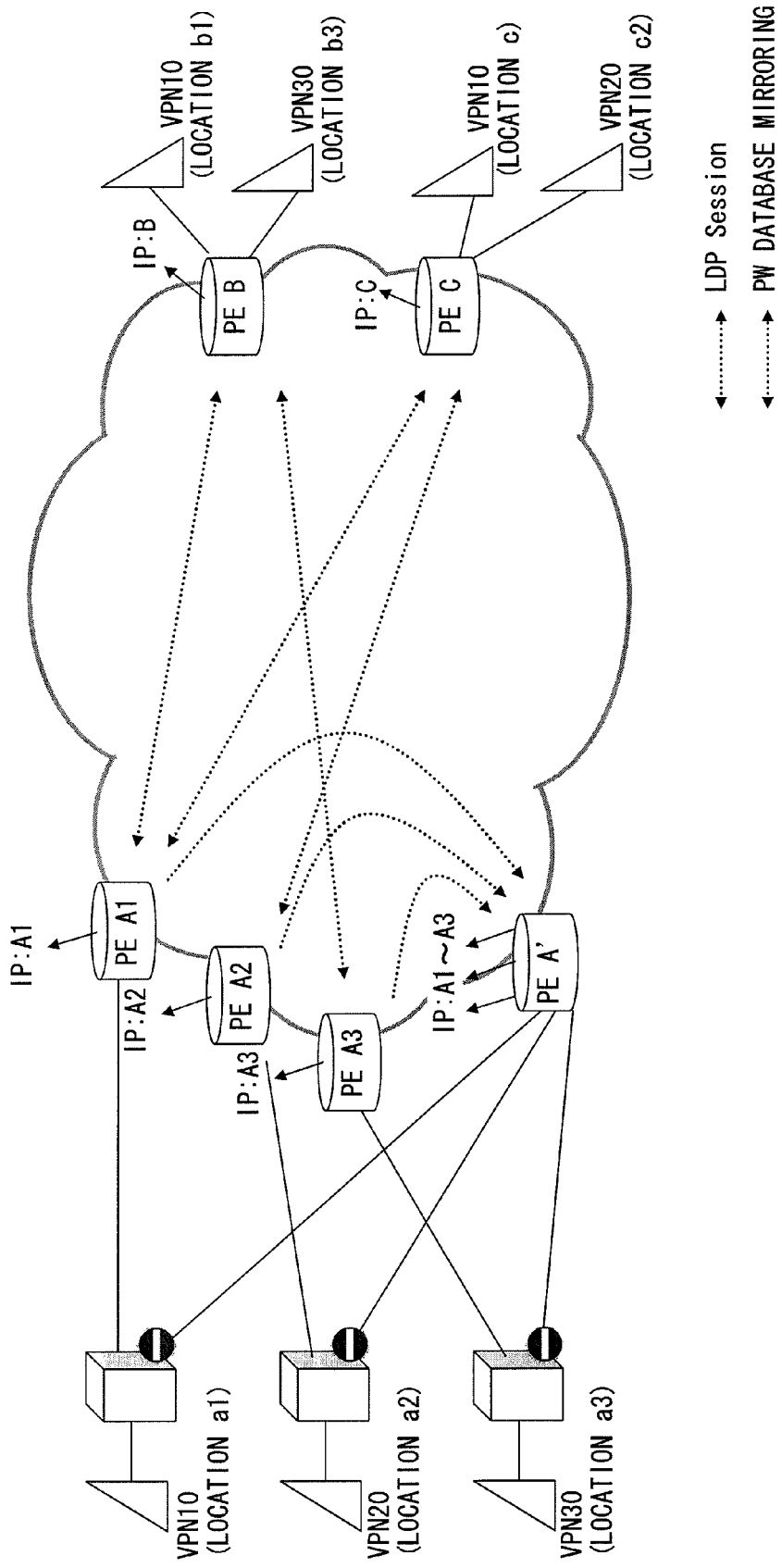
FIG. 12 is another configuration example of the preferred embodiment of the present invention.

FIG. 12 is another configuration example of the preferred embodiment of the present invention.

The number of secondary PEs can be also reduced by generating N:1 redundancy by providing one secondary PE for a plurality of (N) primary PEs for the combination of primary/secondary PEs. In this case, the secondary PE stores N loopback addresses non-active.

Figure 13:
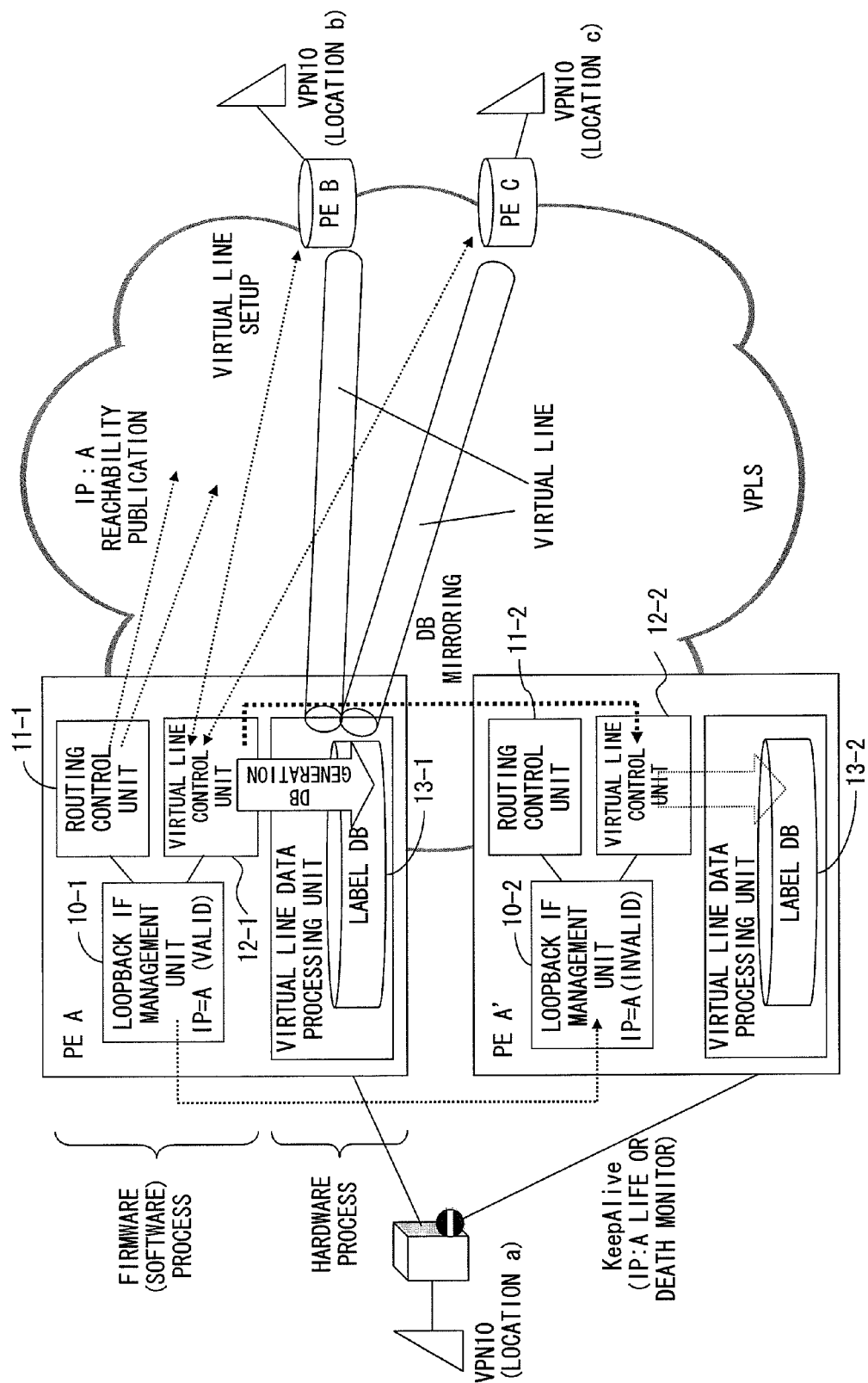
FIG. 13 is the configuration block diagram of a primary PE and a secondary PE.

Specifically, as illustrated in FIG. 12, for example, for three primary PEs whose loopback addresses are A1, A2 and A3, one secondary PE (PE A') storing these loopback addresses. The secondary PE monitors the operations of the plurality of primary PE, specifies a primary PE that cannot operate due to a failure, sets the loopback address of the primary PE in its own PE and operates the same operation as described in the above-described preferred embodiment. In FIG. 12, VPN 10, VPN 20 and VPN 30 are set in locations a1, b1 and c, locations a2 through c2 and locations a3 through b3, respectively. FIG. 13 is the configuration block diagram of a primary and secondary PEs.

Primary and secondary PEs have the same configuration. Specifically, they include virtual line data processing units 13-1 and 13-2, respectively, being hardware processing units, loopback interface management units 10-1 and 10-2, respectively, being firmware (software) processing units, routing control units 11-1 and 11-2 and virtual line control units 12-1 and 12-2, respectively. Normally the virtual line control unit 12-1 of PE A being a primary PE sets a virtual line with opposing PEs (PE B and PE C) and stores the setting information in the label database of the virtual line data processing unit 13-1. Simultaneously, the virtual line control unit 12-1 transmits the setting information to the virtual line control unit 12-2 of PEA' being a secondary PE and enables the virtual line control unit 12-2 to store the setting information in the label database of the virtual line data processing unit 13-2 of PE A'. The loopback interface management unit 10-1 of PE A stores the loopback address IP=A of its own device and normally keeps it valid. Simultaneously, the loopback interface management unit 10-1 transmits this to the loopback interface management unit 10-2 of PE A' and enables the PE A' side to store the loopback address of PE A and to nullify it. PE A' performs the life and death monitoring of PE A. The routing control units 11-1 and 11-2 control the routing of a packet to be transmitted and perform reachability publication for publicizing the loopback address of its own device to a network device and the like.

As described above, although the preferred embodiment of the present invention can be applied to VPWS and VPLS using a control protocol LDP for building an emulation line, it can be also applied to an IP-VPN service using MP-BGF (multi-protocol extensions border gateway protocol) (see RFC4364 and RFC4760) (in this case, BGP graceful restart is usable) (see RFC 4724).

Furthermore, by also sharing the identifier (IP address) of a packet transport label (tunnel label) distribution protocol between primary/secondary PEs, when LDP is used as a distribution protocol, a tunnel route is also automatically switched and addressed to a secondary PE by the secondary PE publicizing the routing of the IP address and distributing a new tunnel label.

Furthermore, although a tunnel label is expelled according to a request from an opposing PE when RSVP-TE (resource reservation protocol traffic extensions), in this case too, a label request message (path message) reaches a secondary PE by the above-described routing publication and a tunnel route is also automatically switched and addressed to the secondary PE by the secondary PE publicizing distributing a new label distribution message (Resv message). For the RSVP-TF, please refer to RFC3209.

The application to the above-described service and protocol can be realized by providing compatibility with the prior art (if the technology of the present invention is not supported, it can be operated as in the prior art) and extending a firmware program mounted on a packet transport node (no hardware extension needed).

Figure 14:
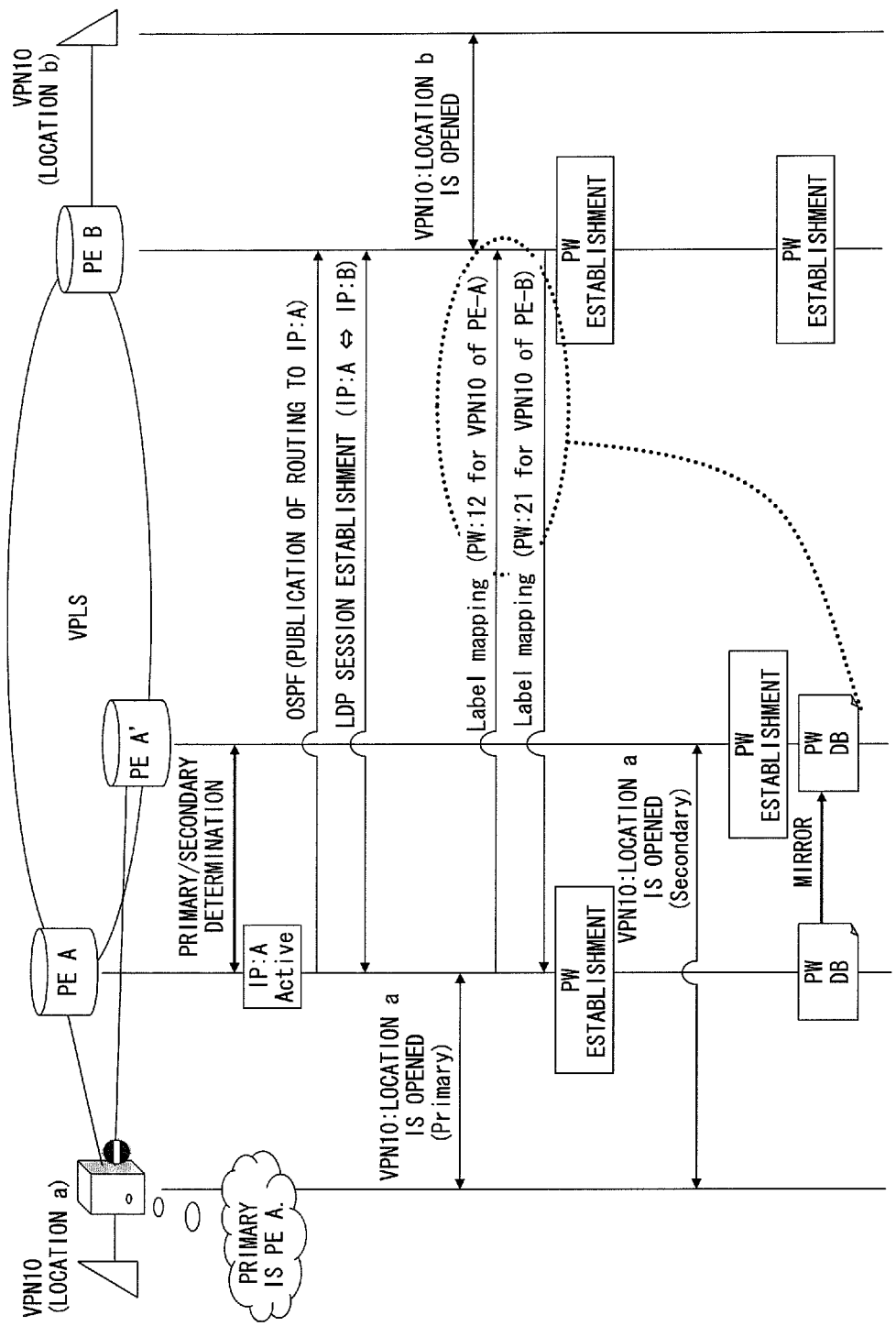
FIG. 14 illustrates a process procedure in the case where the preferred embodiment of the present invention is applied to VPLS (No. 1).
Figure 15A:
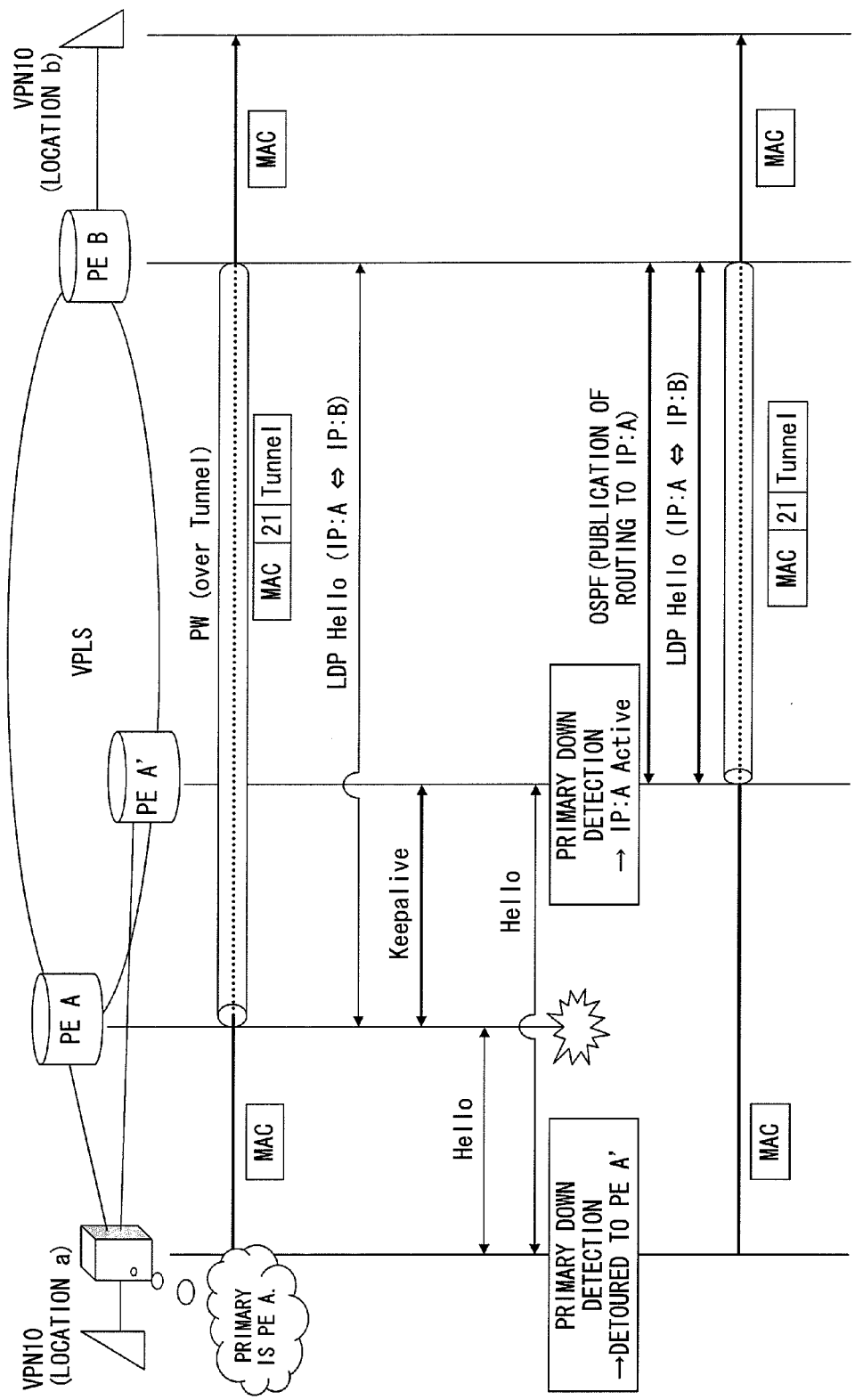
FIG. 15A illustrates a process procedure in the case where the preferred embodiment of the present invention is applied to VPLS (No. 2).
Figure 15B:
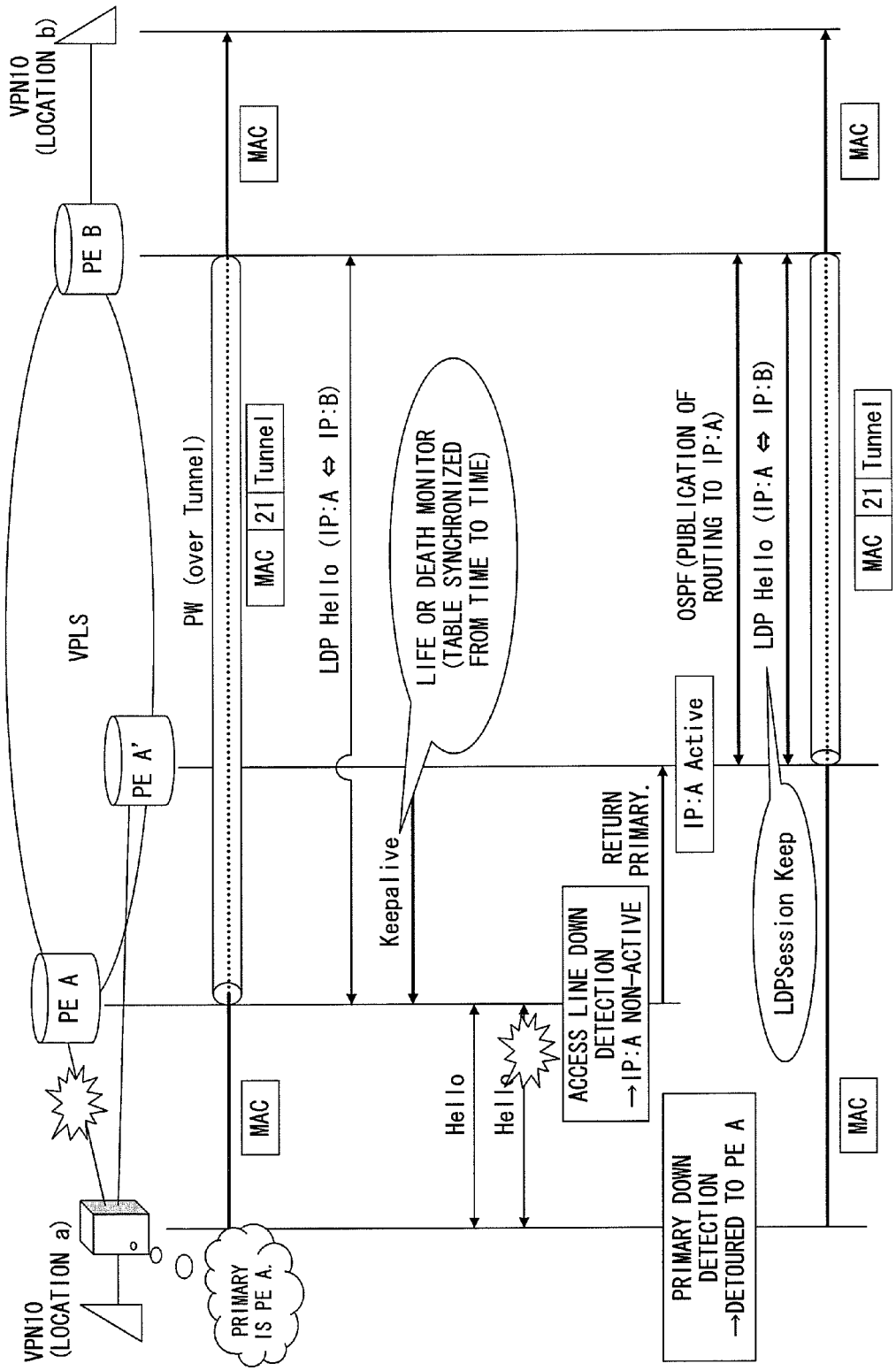
FIG. 15B illustrates a process procedure in the case where the preferred embodiment of the present invention is applied to VPLS (No. 3).

FIGS. 14, 15A and 15B illustrate process procedures in the case where the preferred embodiment of the present invention is applied to VPLS.

In the VPLS setup illustrated in FIG. 14, a case where a VPLS service is provided in an MPLS network is considered. In order to constitute a redundant edge node, a client location is accommodated using one PE (=A) and the other (=A') as primary and secondary PEs, respectively. Although in the prior art, the PE itself does not recognizes which is a primary PE and which is a secondary PE, in the present invention, the PE itself recognizes which is a primary PE and which is a secondary PE (Priority is given in advance in such a way that a PE that accommodates the client location as a primary PE is a primary PE. In this case, it is set in such a way that PE A becomes a primary PE). Then, after performing publication to IP:A by OSPF, PE A establishes an LDP session using an opposing PE (=B) accommodating a client remote location and an LDP session identifier, sets up a PW (PE A' does not sep up differently from the prior art) by performing label mapping, notifies PE A' of the database (the PW label distributed to PE B by PE A and the PW label by which PE A is expelled from PE B) and synchronizes the database.

In the normal operation and the operation at the time of failure switching, since normally PE A receives a data frame (MAC frame) from a client location, as in the prior art, the distributed PW and tunnel labels are attached to the data frame and the data frame is transported to PE B. Furthermore, when another PW is newly built, normally the synchronization is performed from time to time and also life or death monitoring for checking whether a primary PE is active is performed (as in the prior art, life or death monitoring is performed between the node accommodating a client location and PE A).

Figure 8:
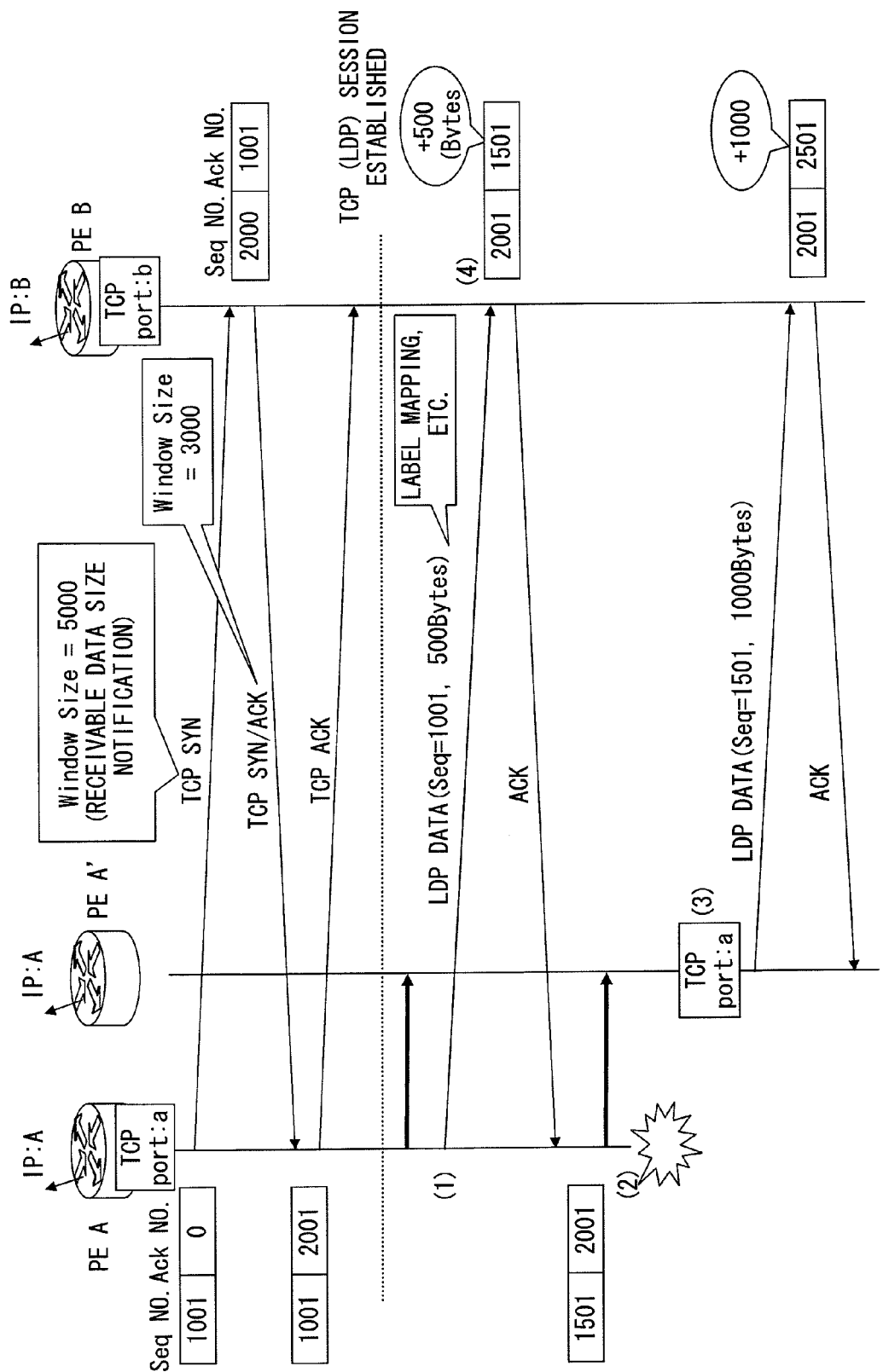
FIG. 8 explains a process for synchronizing session parameters and switching a primary PE to a secondary PE in such a way that an opposing PE does not sense session down.

Then, at the failure time of PE A, when PE A' detects it, it makes IP=A active and publicizes its routing. Simultaneously, PEA' keeps the LDP session with PEB. For its maintenance method, a method for preventing the session down itself from being detected, as illustrated in FIG. 8 or a method using the graceful restart, as illustrated in FIG. 9 is used. In this case, as long as graceful restart is supported, it is no problems if the session itself downs once. Then, (simultaneously the primary failure is detected,) a PW label is attached to the client data frame transmitted to PE A' on the basis of the database synchronized between PE A and PE A' and the data frame is transported to PE B. Furthermore, as illustrated in FIG. 15B, when although PE A itself does not fail, an access line accommodating a location a fails, life or death monitoring is not interrupted. However but traffic from the location a is taken a roundabout way to PE A'. Therefore, PE A returns primary itself and makes PE A' take over IP=A and the LDP session. The operation after that is the same. Specifically, a PW label is attached to the client frame data transmitted to PE A' after the primary failure is detected, on the basis of the database synchronized between PE A and PE A' and the data frame is transported to PE B. In this case, PE B recognizes as if PE B received it from a PW set up essentially with PE A. Therefore, the update process of a MAC table required in the prior art becomes unnecessary.

Figure 16A:
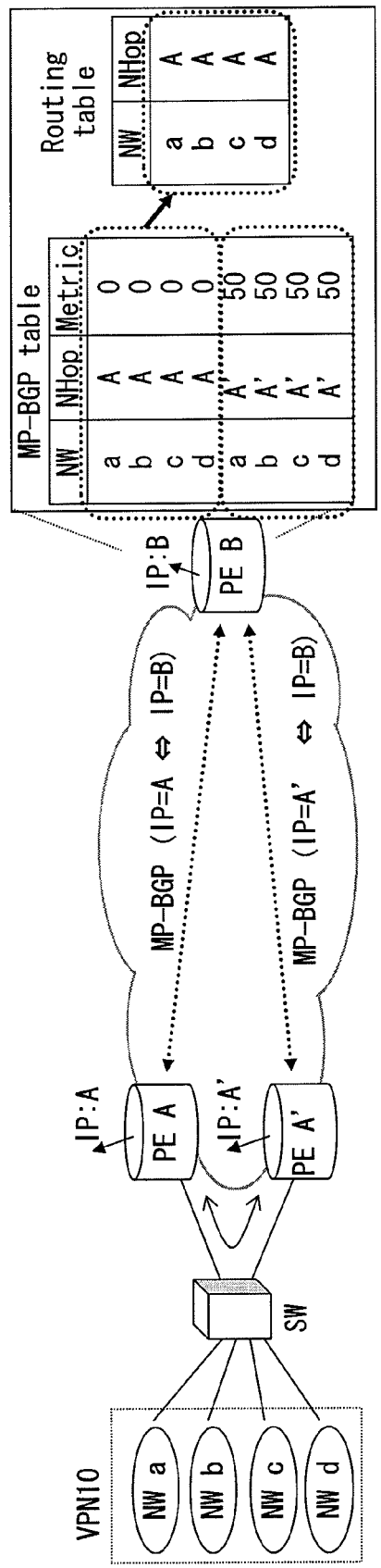
FIG. 16A compares the prior art in the case where the present invention is applied to IP-VPN with the present invention and explains them (No. 1).
Figure 16B:
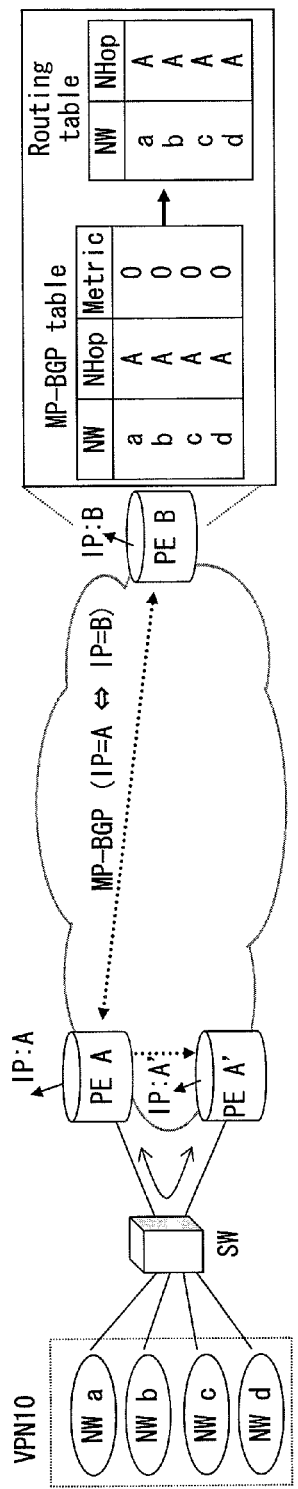
FIG. 16B compares the prior art in the case where the present invention is applied to IP-VPN with the present invention and explains them (No. 2).

FIGS. 16A and 16B compare the prior art in the case where the present invention is applied to IP-VPN with the present invention and explains them.

Although in the above explanation, a VPLS service is used as an example, the operation of the present invention can be also applied to an IP-VPN service. The IP-VPN provides IP reachability between remote locations by exchanging IP network route information for each client (VPN) between edge nodes by MP-BGP being an extension of BGP. As one example of a redundant edge node configuration in IP-VPN, a configuration in which client locations are accommodated in a plurality of edge nodes and IP next hop virtual protocol, such as VRRP, HSRP or the like is operated on the client side of an edge node can be considered as expected. In the prior art, each of primary/secondary PEs publicizes the same IP route information for an opposing PE setting a smaller metric value in the primary PE (higher priority). Then, normally the IP packet of a client is transmitted/received via the Primary PE from the metric value and when the primary PE fails (when the route received from the primary PE is lost), the packet is transmitted/received via the secondary PE. However, in this case too, as illustrated in the MP-BGP table of FIG. 16A, twice number of VPN label paths as that at the time of non-redundancy (four times across the entire network) is required. Furthermore, although not recognized on an IP routing table (since only a top-priority route is described), twice number of MP-BGP receiving routes (and that the same routes) are required.

However, as illustrated in FIG. 16B, by applying the present invention, the above-described problems can be solved. Specifically, normally the above-described problems can be solved by only a primary PE performing the exchange of a VPN label path and the publication of a client IP route, synchronizing the database of the VPN label path table of the primary PE with the corresponding database of the secondary PE. When the primary PE fails, the above-described problems can be solved by capsuling and transmitting the client IP packet referring to the synchronized database while keep the MP-BGP session. In other words, since the MP-BGP table and the IP routing table indicate the same route and at the time of PE A failure, next hop (N hop) is the same, no route update is needed.

Figure 17:
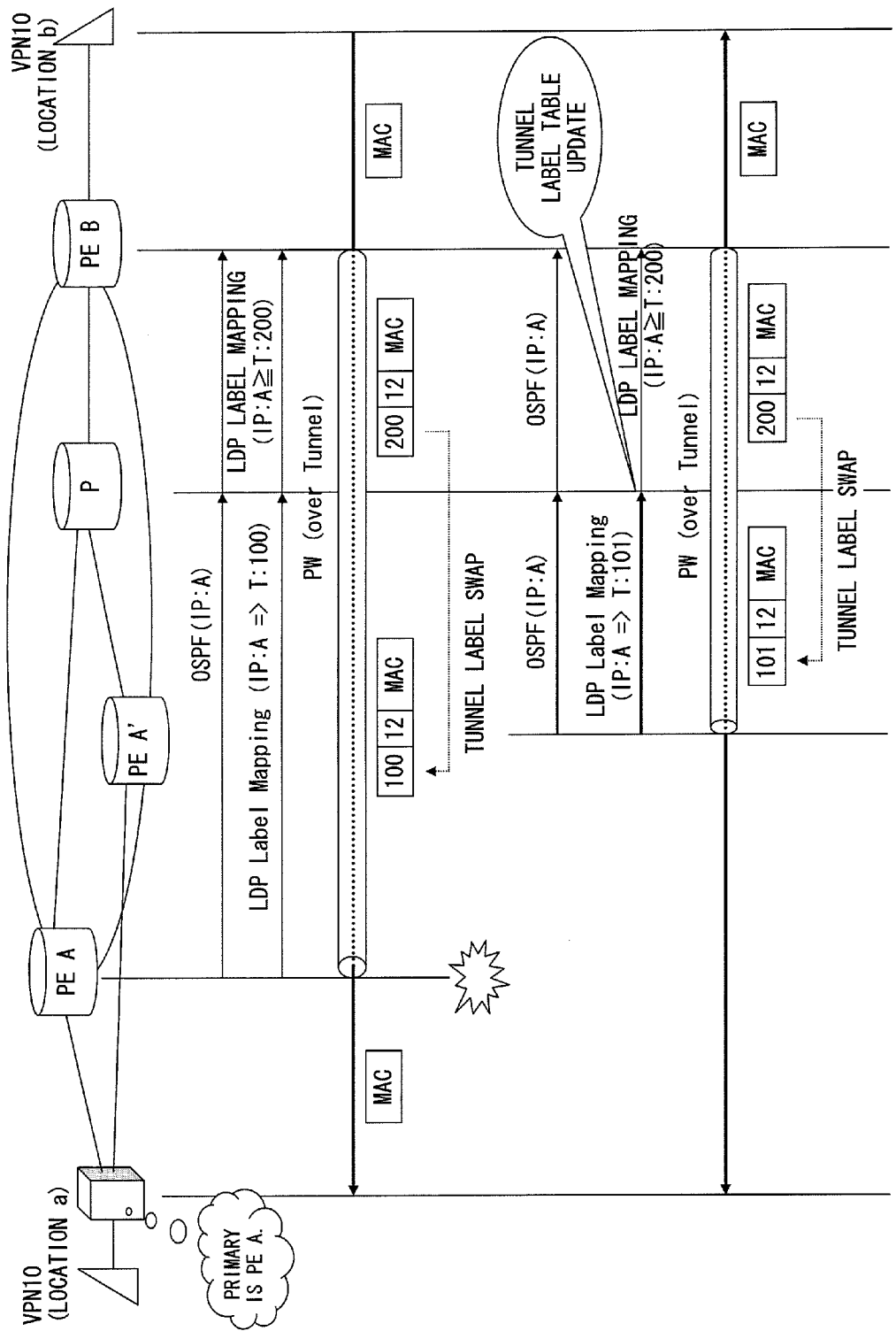
FIG. 17 is the timing chart of a downward packet transport process according to the preferred embodiment of the present invention (No. 1).
Figure 18:
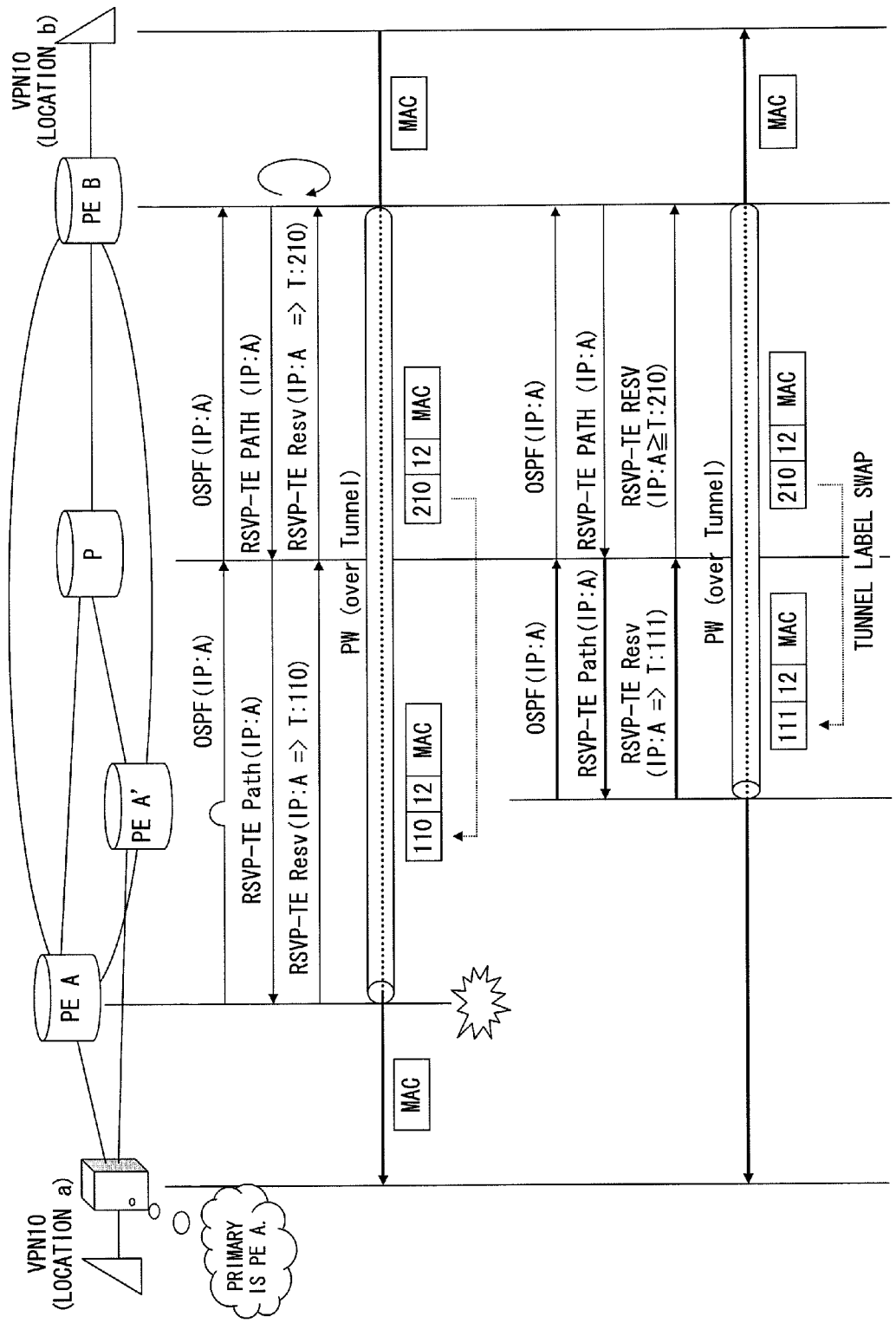
FIG. 18 is the timing chart of a downward packet transport process according to the preferred embodiment of the present invention (No. 2).

FIGS. 17 and 18 are the timing charts of a downward packet transport process according to the preferred embodiment of the present invention.

A downward packet transport flow via a VPLS core node (a node in a core network) from an opposing PE at the time of a primary PE failure will be explained with reference to FIG. 17. As to an upward packet transport flow, since terminal point of the tunnel (the opposing PE) does not change, it is the same as the process flow of the prior art (a packet is transported according to an MPLS tunnel label path whose terminal point is the opposing PE from the primary/secondary PE).

When a tunnel label is distributed by LDP, the label is also distributed according to the routing information to an IP address of a node being the terminal point of a label path by a method called DU (downstream unsolicited). Normally, PE A publicizes the routing of IP=A by OSPF and also distributes a tunnel label to adjacent node (P) (LDP label mapping). The adjacent node P further publicizes the routing of IP=A by OSPF for an adjacent node (PE B) and also distributes the tunnel label by LDP label mapping. Then, when PE A fails, PE A' starts the routing publication of IP=A and also distributes the tunnel label to the adjacent node (P) (LDP label mapping). Then, the adjacent node (P) independently update the tunnel label path whose terminal point is IP=A and finally the label path is updated and addressed to PE A'.

When LDP is used for both a tunnel travel distribution protocol and a PW label distribution protocol in a VPLS service, there is no problem even if the same session identifier (loopback address) is or separate ones are used for the tunnel/PW label as long as the same session identifier is shared between primary/secondary PEs or the separate ones are distinguished from each other.

Furthermore, as illustrated in FIG. 18, when a tunnel label is distributed by RSVP-TE, the tunnel label is expelled from an end point terminal node according a request from a node becoming the start point of the tunnel by a method called DoD (downstream on demand). More specifically, normally, label request message (RSVP-TE path message) from PE B reaches PE A via the adjacent node (P), PE A distributes a label to the adjacent node (P) by a label distribution message (RSVP-TE Resv message) and the adjacent node (P) further distributes a label by RSVP-TE Resv message. In the above-described procedures, finally a tunnel label path is completed.

After that, path message is regularly transmitted and by returning revs message, resources continue to be secured. However, when PEA fails and PEA' starts publicizing the routing of IP=A, the downward tunnel label path is also switched and addressed to PE A'.

As described above, according to the present invention, for example, since no secondary PW for a redundant edge node is needed in VPLS, the number of PWs can be the same as at the time of non-redundancy. Since actually a PW is required for each VPN, the total number of PWs across the entire network increases up to the order of 100K or more. Therefore, the suppression effect of the number of PWs is fairly large. Furthermore, since a failure is not recognized by an opposing PE (recognized as input from the same PW), the update process of a route information (MAC) table is not needed when a primary PE fails.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:
1. A edge node redundant system in a network having a primary node and a secondary node,
   a secondary edge node being a redundant node of a primary edge node, comprising:
      a primary unique address setting unit to store a unique address of the primary edge node, normally nullifying a unique address of the primary edge node and vali- dating a unique address of the primary edge node as a unique address of the secondary edge node when the primary edge node fails;

a primary line data duplicate storage unit to store a tunnel label corresponding to a virtual line normally established between the primary edge node and an opposing edge node in the network; and a communication establishment unit to establish the virtual line to the opposing edge node instead of the primary edge node, using a unique address validated by the primary unique address setting unit and the tunnel label stored in the primary line data duplicate storage unit when the primary edge node fails.

2. The edge node redundant system according to claim 1, wherein when the primary edge node fails, the secondary edge node publicizes for each network device that the secondary edge node itself communicates using a unique address validated by the primary unique address setting unit.

3. The edge node redundant system according to claim 1, wherein the tunnel label is stored with a parameter needed to execute a communication session, when the communication establishment unit establishes communications instead of the primary edge node, takes over a communication session using the parameter and establishes communication in such a way that communication session down is not recognized by the opposing edge node.

4. The edge node redundant system according to claim 1, wherein when establishing communications instead of the primary edge node, the communication establishment unit switches the primary edge node to the secondary edge node using a restart function of a used communication protocol before communication session down restores.

5. A edge node redundant system in a network having a primary node and a secondary node, a secondary edge node, comprising:

a primary unique address setting unit to store a unique address of the primary edge node, normally nullifying a unique address of the primary edge node and validating a unique address of the primary edge node as a unique address of the secondary edge node when the primary edge node fails;

a primary line data duplicate storage unit to store a tunnel label corresponding to a virtual line normally established between the primary edge node and an opposing edge node in the network; and a communication establishment unit to establish the virtual line to the opposing edge node instead of the primary edge node, using a unique address validated by the primary unique address setting unit and the tunnel label stored in the primary line data duplicate storage unit when the primary edge node fails, wherein when one secondary edge node is provided for a plurality of primary edge nodes, the primary unique address setting unit stores all unique addresses of the plurality of edge nodes and validates only a unique address of a failed primary edge node as unique address of the secondary edge node and the communication establishment unit stores all tunnel labels of the plurality of primary edge nodes and establishes communications, using the tunnel label of a failed primary edge node instead of the failed primary edge node.

6. The edge node redundant system according to claim 1, wherein the network is a virtual private wire service (VPWS) or a virtual private LAN service (VPLS), for capsuling and transporting a layer 2 packet of a client and a control protocol for building a line is a label distribution protocol (LDP).

7. The edge node redundant system according to claim 1, wherein the network is an IP virtual private network (IP-VPN) for capsuling and transporting a layer 3 packet of a client and a control protocol for building a line is a multi-protocol extensions border gateway protocol (MP-BGP).

8. The edge node redundant system according to claim 1, wherein the network is a network using multi-protocol label switching (MPLS) as a capsulated packet transport technology and uses a label distribution protocol (LDP) as a packet transport label distribution protocol.

9. The edge node redundant system according to claim 1, wherein the network is a network using multi-protocol label switching (MPLS) as a capsulated packet transport technology and uses a resource reservation protocol traffic extension (RSVP-TE) as a packet transport label distribution protocol.

10. A edge node redundant control method in a network having a primary node and a secondary node, comprising:

(a) storing, by a secondary edge node being a redundant node of a primary edge node, a unique address of the primary edge node, normally nullifying a unique address of the primary edge node and validating a unique address of the primary edge node as a unique address of the secondary edge node when the primary edge node fails;

(b) storing, by the secondary edge node, a tunnel label corresponding to a virtual line normally established between the primary edge node and an opposing edge node in the network; and (c) establishing, by the second edge node, the virtual line to the opposing edge node instead of the primary edge node, using a unique address validated by step (a) and the tunnel label stored in step (b) when the primary edge node fails.

* * * * *